US006667960B1

(12) United States Patent  
Snyder et al.

(10) Patent No.: US 6,667,960 B1
(45) Date of Patent: Dec. 23, 2003

(54) PROTOCOL FOR IDENTIFYING COMPONENTS IN A POINT-TO-POINT COMPUTER SYSTEM

(75) Inventors: Robert D. Snyder, Ouistreham (FR); Benjamin Dodge, Cupertino, CA (US); Dean T. Lindsay, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,594

(22) Filed: Apr. 29, 2000

(51) Int. Cl.[7] ............................................... H04L 12/28
(52) U.S. Cl. ...................................... 370/255; 370/380
(58) Field of Search ................................ 370/254, 255, 370/256, 257, 258, 351, 400, 407, 380

(56) References Cited

U.S. PATENT DOCUMENTS

| | | | | |
|---|---|---|---|---|
| 4,644,532 A | * | 2/1987 | George et al. | 370/255 |
| 4,914,571 A | * | 4/1990 | Baratz et al. | 707/10 |
| 4,987,536 A | * | 1/1991 | Humblet | 709/241 |
| 5,049,873 A | * | 9/1991 | Robins et al. | 340/825.01 |
| 5,051,987 A | * | 9/1991 | Conlon | 370/255 |
| 5,093,824 A | * | 3/1992 | Coan et al. | 370/228 |
| 5,297,138 A | * | 3/1994 | Black | 370/254 |
| 5,303,235 A | * | 4/1994 | Chan et al. | 370/254 |
| 5,732,086 A | * | 3/1998 | Liang et al. | 370/410 |
| 5,805,593 A | * | 9/1998 | Busche | 370/396 |
| 5,886,643 A | * | 3/1999 | Diebboll et al. | 709/224 |
| 6,041,049 A | * | 3/2000 | Brady | 370/351 |
| 6,377,987 B1 | * | 4/2002 | Kracht | 709/220 |

FOREIGN PATENT DOCUMENTS

| | | | | |
|---|---|---|---|---|
| EP | 474373 A2 | * | 3/1992 | G06F/15/16 |
| EP | 594198 A2 | * | 4/1994 | H04L/12/56 |
| WO | WO 97/21174 | * | 12/1996 | G06F/13/14 |
| WO | WO 9957853 A1 | * | 11/1999 | H04L/12/28 |

OTHER PUBLICATIONS

Evequoz, C., "Cost–performance Analysis of Cascaded Crossbar Interconnected Multiprocessors". Computers and Digital Techniques, IEEE Proceedings. Mar. 1995, vol. 142, iss. 2, pp. 117–134.*

Lowekamp, Bruce et al., "Direct Queries for Discovering Network Resources Properties in a Distributed Environment". School o Computer Science, Carnegie Mellon University. PA. Jun. 1999.*

* cited by examiner

Primary Examiner—Chau Nguyen
Assistant Examiner—Donald L Mills

(57) ABSTRACT

A system and method of mapping a network topology in a network including a plurality of nodes which communicate over dedicated links which connect pairs of the nodes, where the method consists of the steps of exchanging respective network identification information between adjacent pairs of nodes, establishing communications with another of the nodes using the network identification information, obtaining network identification information of the other node from that node, using the network identification information to establish communications with other nodes, obtaining additional network identification information from those other nodes, repeating these steps until network identification information is obtained from all of the nodes of the network and using this information determine the network topology.

10 Claims, 3 Drawing Sheets

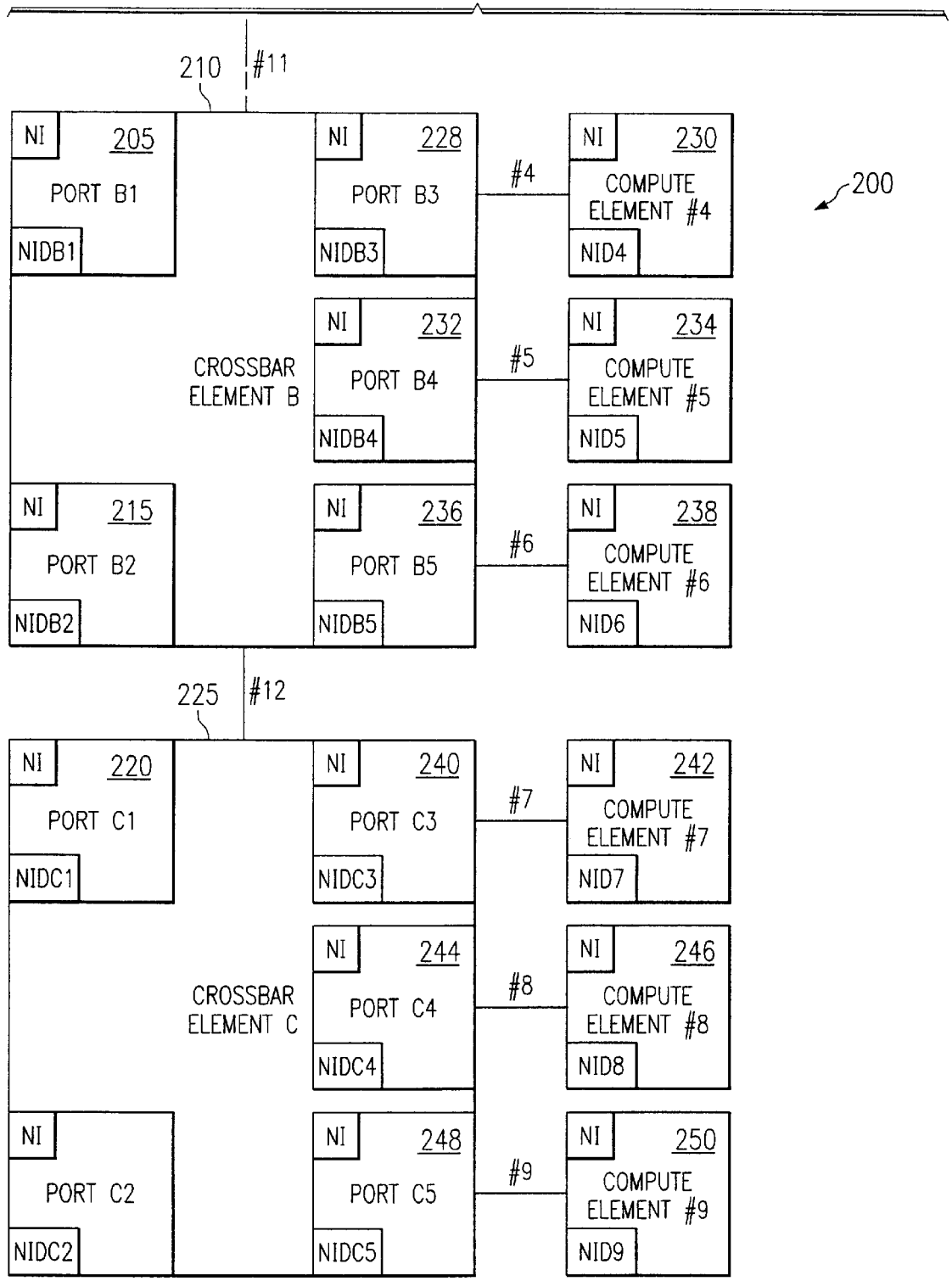

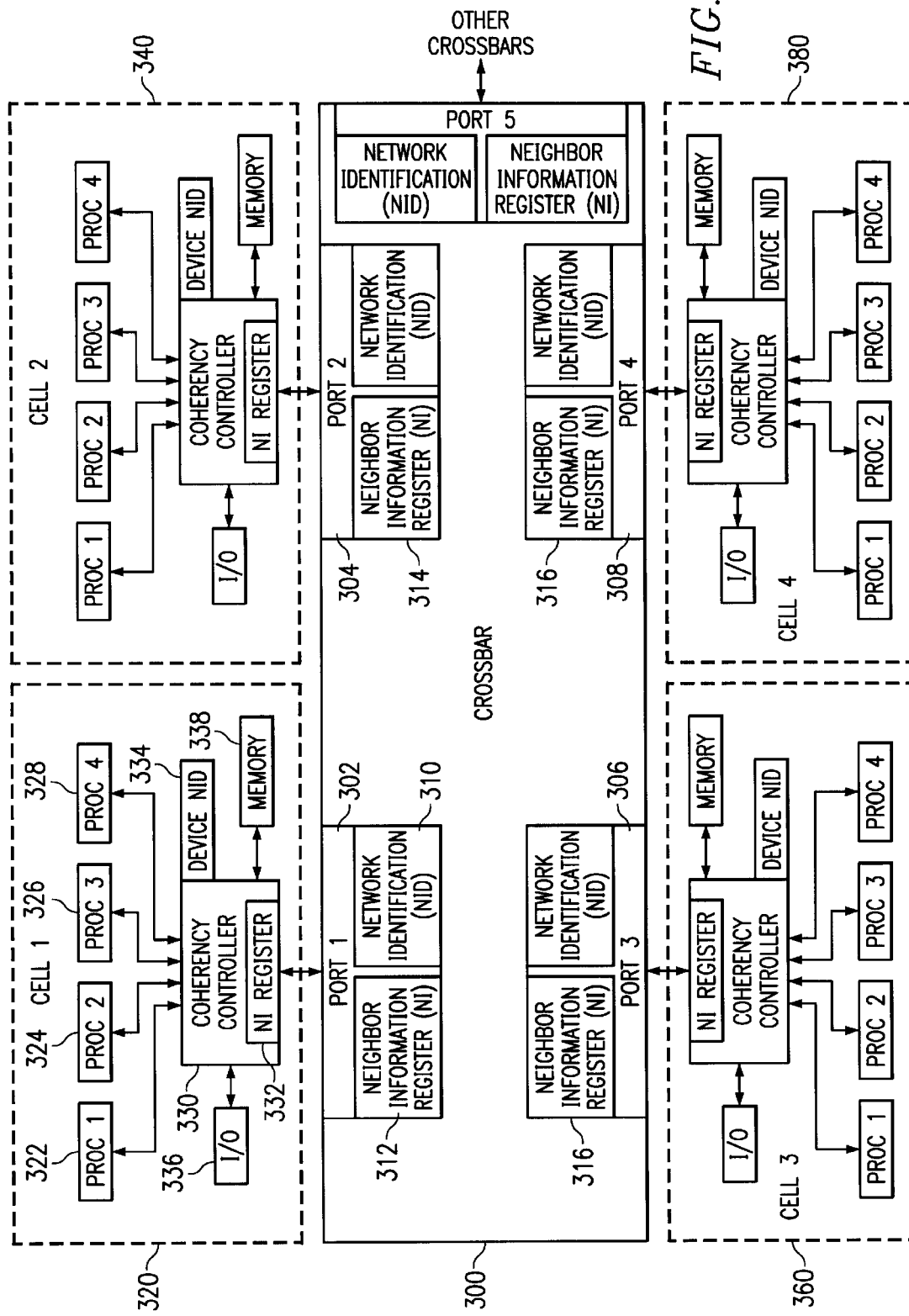

PROTOCOL FOR IDENTIFYING COMPONENTS IN A POINT-TO-POINT COMPUTER SYSTEM

BACKGROUND

Server class computer products are constructed by the combination of modular sets of computer components. These components can consist of a number of processors, a global-shared memory environment, main memory, PCI (Peripheral Components Interface) controllers and other components as required. Server class computer products can also be configured using basic building blocks. Example building blocks include a cell, a crossbar system, a routing chip and a PCI-based input/output (I/O) subsystem. In this case, a cell consists of shared multiprocessor (SMP) system containing from one to four (or more) processors, a portion of system memory and a connection to an I/O subsystem. Normally the cell is designed such that the hardware will not limit the mixture of different types of cells within the system. Cells can also be added or removed while the system is running. In typical systems, the cell resides on a single PC board.

The components included in the system can communicate with each other through a common bus or through point-to-point communication. Point-to-point communications consist of a discrete path such as a dedicated or switched line from one system component to a second system component. In addition or as an alternative to individual point-to-point communications, a crossbar system, a second building block, can provide switched non-blocking point-to-point interconnection between a number of cells and their associated memory. In systems, the crossbars are expected to reside oh backplanes. The third basic building block, the routing chip, connects the crossbar system to a high speed link for connecting a number of nodes into a single large system. The routing chip forms a high availability firewall to prevent failures in one node from affecting other nodes. Links can also be added or removed while the system is running. The fourth basic building block, the I/O subsystem provides connections for a number of PCI buses. Each cell has a link to a single I/O subsystem which can be located in another cabinet. PCI cards or entire I/O subsystems can be added or removed while the system is running.

A node is comprised of a set of cells connected by crossbars. Node-to-node connections are made using an interfacing routing chip (RC) and associated cables. Nodes can also be connected to each other to form larger systems.

When the system architecture is fixed, individual processors within cells can be made aware of other elements in the system through an available hardware architecture map. This hardware architecture map can be provided to the processor through its inclusion in read only memory (ROM). In this configuration a processor accesses the hardware architecture map stored in ROM to determine which other system components are available and communicates accordingly.

If all the system components are connected to a common bus, a processor on the bus has access to addresses of other system components through bus converters. By traversing the bus, the processor is connected to bus converters which connect to other buses in the system. Using this information, a processor can construct a network architecture or topology which identifies other system components within the system. Within this system, when one processor addresses a message to a second processor, the bus converter and the bus become transparent and the messages are passed from the sending processor to the receiving processor. That is, there is no indication or information provided about message routing. Through the use of this network architecture or topology the processor is aware of the functional connections between system components. However, using this system the processor is unaware of the physical layout of other system components or of the overall connecting and messaging network topology.

A processor's knowledge of the topology is important to reduce overhead associated with interactions between system components. By reducing the pathways between cooperating system components, associated overhead expenses are reduced.

Identifying the topology in a point-to-point system is more difficult then when system components are connected with a common bus. One method of identifying the topology is an exhaustive search. In an exhaustive search a single processor determines other system components by sending messages to every possible address.

Alternatively, sideband signals can be used to identify connected system components. For example, if system components have six-bit addresses, six physical wires can be run from one processor to its neighboring hardware component. The processor can then put its six-bit address on these dedicated wires and the attached physical component can determine the processor's address through these wires. Additionally, six separate wires would have to be run from the hardware component to the processor so the processor could determine the hardware component's six-bit address over these six dedicated wires. In this configuration accommodating 64 component addresses, twelve (12) wires are required between each set of two components so that each component would be aware of its neighboring hardware component's address. These hardware addresses could be determined through the use of dip switches. Although this is the simplest way of passing address elements between components, it is also the most expensive in terms of wires run. In this case, software would not be required to pass component addresses since the physical wires themselves contain the addresses.

The number of wires could be reduced by the introduction of logic to serialize the exchange of address information. If a bidirectional wire is used between the two system components, a single wire can be used to exchange addresses between the two components. In this case coordination must be obtained through software or hardware components to ensure the bi-directional communication is satisfactorily obtained. However, with a bi-directional connection, sideband signals indicating neighboring components are not normally passed between the components.

Accordingly, a need exists for systems in which components can exchange address information while minimizing costs in terms of wire runs and software or hardware control components. A further need exists for a system that allows system components to generate and maintain a functional and physical topology of system components.

SUMMARY OF THE INVENTION

These and other objects, features and technical advantages are achieved by a system and method which, according to one aspect of the invention, include a method of mapping a network topology in a network that includes a plurality of nodes communicating with each other over dedicated links connecting pairs of the nodes. The method includes exchanging respective network identification information between adjacent pairs of nodes and, establishing communications with another of the nodes (i.e., the neighbor's neighbor node) using the network identification information. Network identification information of the other node from that node, using the network identification information to establish communications with other nodes, obtaining additional network identification information from those other nodes, repeating these steps until network identification information is obtained from all of the nodes of the network and using this information determine the network topology.

According to a feature of the invention, the network identification of immediately adjacent nodes (i.e., neighboring nodes) are stored in respective network identification registers. The nodes include both terminal nodes (i.e., data users and sources) and switching nodes (i.e., communications resources). Thus, the terminal nodes include processing cells and the switching nodes may include crossbar switching devices.

According to features of the invention, the steps of identifying and recording the identification information of neighbors may be performed either iteratively (e.g., by depth first probing to reconnect topology starting outward and progressing toward a rest node).

For either cases the resultant network topology is stored by at least one of the nodes.

According to another feature of the invention the network information obtained includes both network address and device identification information.

According to another aspect of the invention, a data processing system includes a plurality of terminal nodes, each of which has a communication port and where each terminal node is assigned a unique network identification and a network identification register. A number of switching nodes are also each assigned a unique network identification, each switching node having at least two communications ports in communication combinations of (i) the other switching nodes and (ii) the terminal nodes. Network identification registers associated with each of the at least two communications ports are indexed as part of each switching node. Logic circuitry in the form of hardware or a combination of hardware, firmware and/or software, initiates an exchange of the network identification between connected terminals and switching nodes where each of the nodes stores the network identification of adjacent (i.e., neighboring) nodes in its network identification registers. A memory stores a topology of the data processing system based on the exchange of the network identification exchanged between the nodes.

The foregoing has outlined rather broadly the features and technical advantages of the present invention in order that the detailed description of the invention that follows may be better understood. Additional features and advantages of the invention will be described. hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 2A and 2B depict a block diagram of three nodes interconnect using crossbar elements;

FIG. 3 is a block diagram of a portion of a multiprocessor system incorporating a protocol according to the invention.

DETAILED DESCRIPTION

Figure 1:
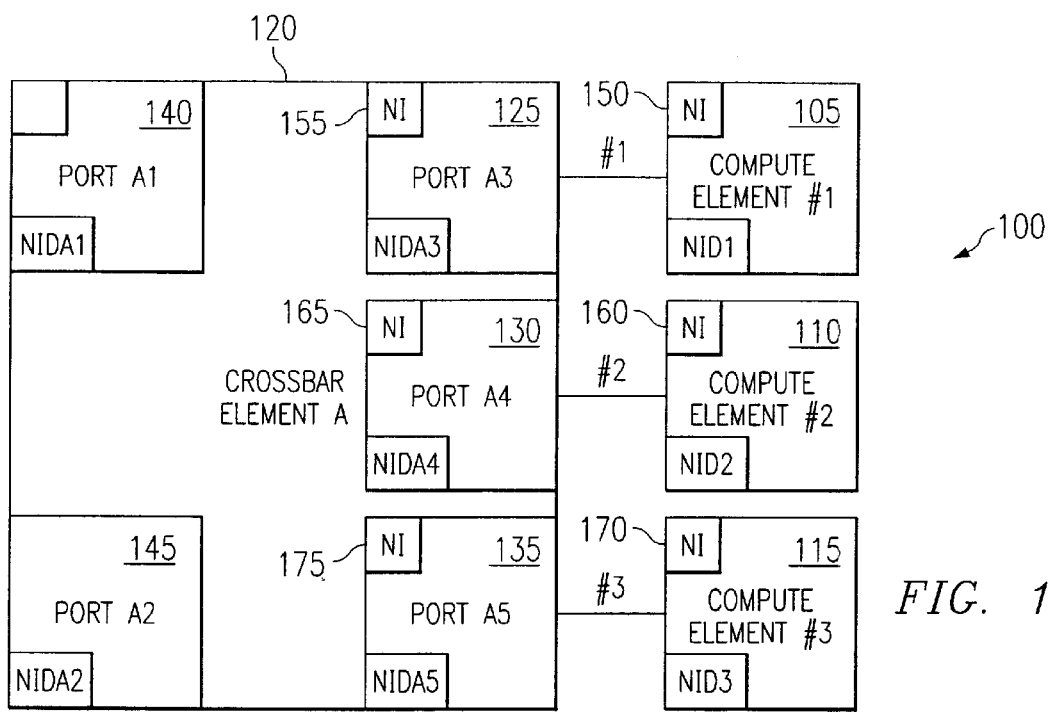
FIG. 1 is a block diagram of a cell connected to three compute elements.

The invention assigns each device a network identification, including a network address for communicating with the device, and information about the device, such as the function of the device, number of ports supported by and active on the device, etc. This data is stored by each device and is exchanged at system initialization with all neighboring nodes. The data received from neighboring nodes is received and stored in a NID Register included for this purpose as part of each node and/or associated with each port connected to another device. Thus, referring to FIG. 1, system 100 includes three processors or compute elements 105, 110 and 115. Each of these compute elements are attached via a respective communications link to a respective port of crossbar element 120. Compute element 105 is attached via link #1 to port 125; while compute element 110 is attached to port 130 via link #2 and compute element 115 is attached to port A5 (135) via link #3.

Crossbar element A (120) also contains port A1 (140) and port A2 (145). Each of the compute elements also has a network ID. Compute element 105 has a network ID of NID1, port A3 (125) has a network ID NIDA3, port A4 (130) has a network ID NIDA4 and port A5 (135) has a network ID NIDA5.

Each system component in system 100 also contains a Neighbor Information (NI) register. The NI is used by the system component to store the connected network component and its address. This exchange of information occurs during a hardware linked level protocol and is used to initialize the point-to-point communication paths between the components. Entities on both sides of the link send their device type and ID numbers and the receiving entity records this information in their NI register.

Referring specifically to system 100, as part of its initialization, compute element 105 sends its network ID, NID1, to port 125. Port 125 stores compute element 125's network ID, NID1, in its NI register 155. Similarly, compute element 105 stores port A3's network ID, NIDA3, in its NI register 150. In addition to the network ID of port A3, compute element 105 also stores in its NI register 150 the type of system component it's connected to, in this case port A3 of a crossbar element A. Similarly port A3 (125) also stores the type of component it's connected to in its NI register, namely compute element 105.

Compute element 110 stores both the type of system component port A4 of crossbar element A and the address of the component, NIDA4, in its NI register 160. Port A4 stores in its NI register the network ID of compute element 110. Finally, compute element 115 stores port A5 of crossbar element A in its NI register 170 and port A5 would store compute element No. 3 and its ID, NID3, in its NI register 175.

Compute element 105 can then begin to construct a network architecture of topology using the information stored in its NI register. By accessing the information in its NI register 150 compute element 105 knows that it is connected to port A3 of a crossbar element A whose address is NIDA3. Compute element 105 also knows that the crossbar element has five (5) ports, in this case, ports A1, A2, A3, A4 and A5. Knowing that crossbar element has five (5) ports, compute element 105 can also query crossbar element A to determine which system components are connected to its other ports. In this case, compute element 105 would acquire from crossbar element A that port A4's address is NIDA4; that port A5's address is NIDA5; that port A1's address is NIDA1 and that port A2's address is NIDA2.

Compute element 105 can also query each of these ports to identify which system component are connected to that port. In this case, compute element 105 would query port A4 (130) and access port A4's NI register 165 to determine that compute element 110 is connected to port A4, that its address is NID2 and that it is a compute element. Similarly, compute element 105 can query port A5's neighbor information register 175 of crossbar element 120 to determine that compute element 115, having network ID NID3, is linked to port A5. In the absence of any other system components connected via port 140 or port 145, compute element 105 can determine the topology of the entire system in this method. Similarly, compute element No. 2 can follow the same process to determine and record its own copy of the topology. Compute element No. 3 will also query port A5, port A4 and port A3 of crossbar element A to determine which system components are connected via those ports. In this method compute element No. 3 also determines the system topology.

Figure 2A:
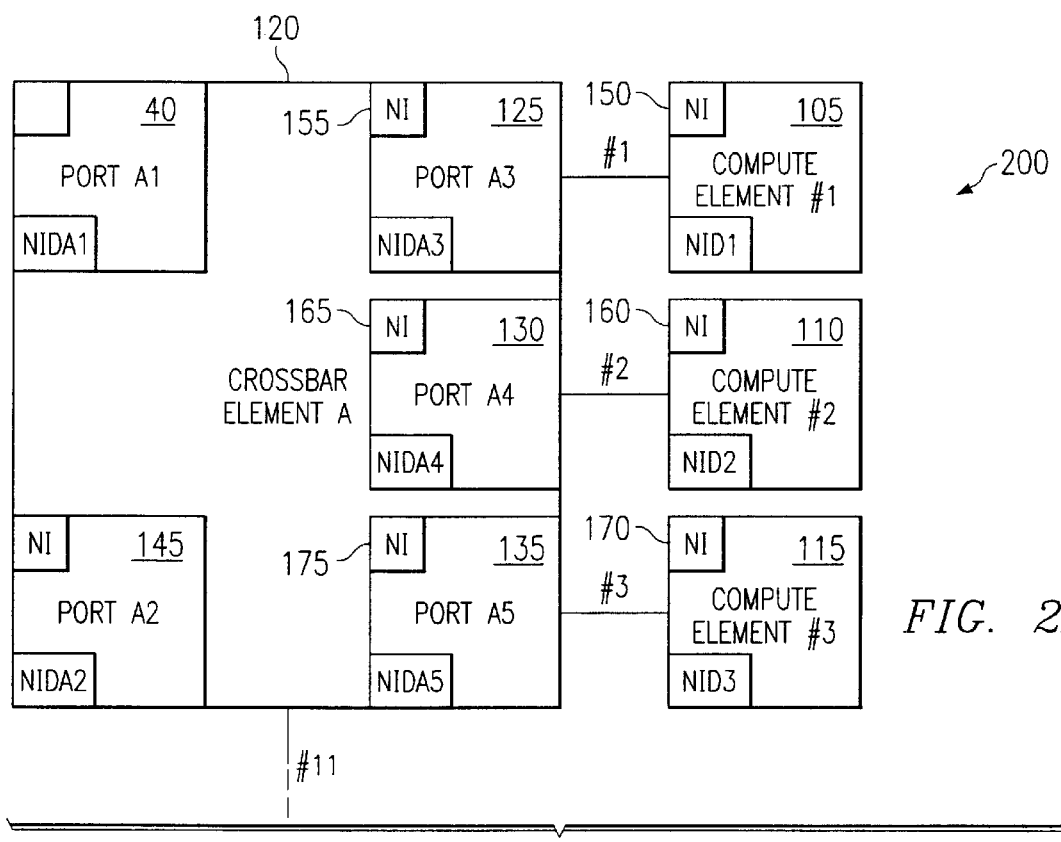

System 200 of FIGS. 2A and 2B has port B1 of crossbar element B attached to port A2 of crossbar element A. Additionally, port B2 of cross-element B is attached to port C1 of crossbar element C.

As explained with reference to compute element 105, compute element 110 and compute element 115, in their initialization communicate respectively with ports A3, port A4 and port A5 of cross element 120, and identification numbers were exchanged and recorded in respective neighbor information registers for each of these components. Similarly, compute element 230 exchanges information with port B3 of crossbar element 210 containing the type of system component and fabric addresses which are also exchanged between compute element 234, port B4 and compute element 238 with port B5.

System components and fabric addresses are also exchanged between compute element 242, port C3, compute element 246 with port C4, and compute element 250 with port C5. In each of these instances the information received is stored in the NI register.

In this case since port A2 (145) of crossbar element A (120) is connected to port B1 (205) of cross element B (210), Port A2 and port B1 also exchange identifying information and ID's and this information will be stored in the appropriate NI registers. Similarly, port B2 (215) of cross element B (210) will be exchanged with port C1 (220) of cross element C (225). In system 200, compute element 105 we continue to build a network topology map through its connection via link one with port A3 of cross element A (120). In this manner, compute element 105 will determine both a functional and a physical topology of the system.

The inclusion of the physical topology within the compute elements allows a more efficient use of system resources. Suppose compute element 105 requires additional processing capabilities. Compute element 105 will communicate via link 1 with port A3 of crossbar 120 in an attempt to acquire additional processing capabilities. If compute element 105 decided to use compute element 230 for its additional processing capabilities, the information from compute element 105 would have to traverse link 1 to port A3 and link 11 from port A2 of crossbar element A to port B1 of crossbar element B. Additionally, the information would traverse link 4 from port B3 (228) of crossbar element B to compute element 230. In this instance, links 1, 11 and 4 are used. If, at the same time, compute element 110 also required additional processing capabilities it could traverse link 2 (to send its request to port A4 of crossbar element 120), link 11 (to communicate between port A2 and port B1), and link 5 (to communicate between port B4 and compute element 234) to use compute element 234's resources. Each of these system resources would be required for information to pass from compute element 110 to compute element 234. In this instance both compute element 105 and compute element 110 would compete for the resources of link 11 between port A2 of cross element 120 and port B1 of cross element 210. With the knowledge of the physical topology of the system, compute element 105 could instead elect to use neighboring compute element 115 and eliminate this contention for the use of link 11.

FIG. 3 is a block diagram of a portion of another multi-processor architecture incorporating the invention. In this architecture, multiple processing cells 320, 340, 360 and 380 are connected to respective ports 302, 304, 306 and 308 of crossbar switching unit 300 which, in turn, is connected to at least one other similarly configured crossbar switching unit (not shown). Each processing cell 320, 340, 360 and 380 includes at least one processor, although, for this example, each cell is shown similarly configured with four processors 322, 324, 326 and 328. Each cell also includes a coherency controller 330 connected to the processors for servicing memory access and I/O requirements for both the local processors of the cell and providing remote access to cell resources to other cells. Each cell further includes a local memory 338 and an I/O access unit 336 connected to coherency controller 330. Local memory 338 may be used exclusively by processors 322–328 of the cell or, more typically, constitute a portion of a distributed system memory resource generally available to accessible by all cells by way of crossbar 300 and coherency controller 330. Similarly, I/O access unit 336 is also accessible by the rest of the system resources.

As shown, each of cells 320, 340, 360 and 380 may include multiple processors, the grouping of four cells comprising a node. Thus, each cell may include up to four processors so that a node may include up to sixteen processors, four memory units, and I/O access. Referring again to FIG. 3, each major functional unit including the individual cells and crossbar 300 are assigned unique network node addresses for routing message to (and from) the units. In the case of each cell, coherency controller 330 is assigned a unique node address as the point of interface or demarcation between the cell (including its processors, memory and I/O capabilities) and crossbar 300. This network address information together with other information required or useful to traverse and map the communications network to determine its topology is stored in a local memory 334 accessible at system and cell initialization. The additional information includes cell identification such as device type, capabilities, and other parameters needed to access and utilize cell structures, capabilities and features. Similarly, crossbar 300 includes memory 310 storing its network address, device type (five port crossbar switch), and any information and parameters required to operate and traverse the crossbar. While each port may be assigned a unique network node address, the present embodiment instead assigns crossbar 300 a single network node address.

Each network node interface is required to communicate information about the node (i.e., NID) to, and receive and store neighbor information from, its neighboring nodes. Thus, port 302 of crossbar 300 includes NI Register 312 operable to receive and store Device NID 334 about cell 320 as transmitted to it at system or cell initialization by Coherency Controller 330. Similarly, coherency controller 330 of cell 320 includes NI register 332 operable to receive and store Device NID 310 and port information of port 302 about crossbar 300 as transmitted to it at system initialization by Port 302. Preferably, cell 320 initiates communications with port 302 including transmission of its NID and port 302 responds in part by returning its Neighbor Information.

As can be readily appreciated, upon completion of the above described exchange of NID information, each terminal node (e.g., cell) has the NI of its neighboring node, typically a routing node such crossbar 300. Similarly, each routing node will have obtained and stored, by the respective ports, the neighbor information of its neighbors. Thus, either a breadth first or depth first traversal of the network by a node will map the network and provide a record of the network topology.

Referring again to FIG. 3 of the drawings, a traversal of the network by cell 320 might proceed as follows. After initially exchanging neighbor information with crossbar 300, cell 320 would use this information to address a message to the crossbar to retrieve neighbor information contained in each of the neighbor registers of the crossbar. Since each of the ports of the crossbar store the neighbor information of nodes to which the respective port connects, cell 320 can use that information to address the nodes neighboring crossbar 300 and obtain further information including, in the case of neighboring crossbars, neighbor information of nodes connected thereto. Knowing both the addresses, types and intermediate nodes required to access all other network nodes, cell 320 can thereby determine the topology of the network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A data processing system comprising:
    a plurality of terminal nodes having a communication port, each of said terminal nodes assigned a unique network identification and having a network identification register for storing neighbor device network identification information;
    a plurality of switching nodes, each assigned a unique network identification and having at least two communications ports in respective communication with two of (i) others of said switching nodes and (ii) said terminal nodes, each of said switching nodes having respective network identification registers associated with said at least two communications ports;
    logic circuitry configured to initiate an exchange of said network identification between connected ones of said terminal and switching nodes, each of said nodes storing in its respective network identification registers the network identification of adjacent ones of said nodes; and
    a memory storing a topology of said data processing system based on said exchange of said network identification between said nodes.

2. The data processing system according to claim 1 wherein said plurality of terminal nodes include processing cells and said switching nodes include crossbar devices.

3. The data processing system according to claim 1 wherein said network information includes network address and device identification information.

4. The data processing system according to claim 1 wherein said logic circuitry operates recursively.

5. The data processing system according to claim 1 wherein said logic circuitry operate iteratively to determine a topology of said nodes.

6. A data processing system comprising:
    a plurality of terminal nodes having a communication port, each of said terminal nodes assigned a unique network identification and having a network identification register for storing neighbor device network identification information;
    a plurality of switching nodes, each assigned a unique network identification and having at least two communications ports in respective communication with two of (i) others of said switching nodes and (ii) said terminal nodes, each of said switching nodes having respective network identification registers associated with said at least two communications ports;
    means for initiating an exchange of said network identification between connected ones of said terminal and switching nodes, each of said nodes storing in its respective network identification registers the network identification of adjacent ones of said nodes; and
    means for storing a topology of said data processing system based on said exchange of said network identification between said nodes.

7. The data processing system according to claim 6 wherein said plurality of terminal nodes include processing cells and said switching nodes include crossbar devices.

8. The data processing system according to claim 6 wherein said network information includes network address and device identification information.

9. The data processing system according to claim 6 wherein said logic circuitry operates recursively.

10. The data processing system according to claim 6 wherein said initiation means operates iteratively to determine a topology of said nodes.

* * * * *